United States Patent
Howell

(10) Patent No.: US 6,363,498 B1
(45) Date of Patent: Mar. 26, 2002

(54) METHOD AND APPARATUS TO AUTOMATICALLY BACK UP SWITCHING SYSTEM FILES

(75) Inventor: Ronald E. Howell, Bolingbrook, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/975,382

(22) Filed: Nov. 20, 1997

(51) Int. Cl.[7] ................................................ H04M 3/00
(52) U.S. Cl. ........................ 714/15; 379/268; 379/269; 379/279; 714/43
(58) Field of Search ............................. 714/15, 25, 40, 714/43; 379/268, 269, 279

(56) References Cited

U.S. PATENT DOCUMENTS

| | | | |
|---|---|---|---|
| 4,894,828 A | * 1/1990 | Novy et al. | 714/11 |
| 5,745,753 A | * 1/1995 | Mosher, Jr. | 707/204 |
| 5,469,503 A | * 11/1995 | Butensky et al. | 379/279 |
| 5,491,742 A | * 2/1996 | Harper et al. | 379/201 |
| 5,515,429 A | * 5/1996 | Kawada et al. | 379/279 |
| 5,751,574 A | * 9/1996 | Loebig | 714/3 |
| 5,619,557 A | * 4/1997 | Van Berkum | 379/201 |
| 5,875,242 A | * 2/1999 | Glaser et al. | 379/279 |
| 5,910,984 A | * 6/1999 | Low | 379/279 |

* cited by examiner

Primary Examiner—Stephen S. Hong
Assistant Examiner—Wasseem H. Hamdan

(57) ABSTRACT

Computer-controlled switching systems, such as telephone switching systems, like the No. 4ESS™, are extremely complex. Such systems routinely require millions of bytes of program instruction and millions of bytes of data to function. When a system is lost, or is rendered inoperative, reassigning the tasks of the system to a backup or replacing the system can be simplified if a backup copy of the program and data is available. Automatically performing the tasks under program control greatly reduces the complexity of the tasks and improves system reliability. Automatic backup of complex system software and data files is accomplished under program control which periodically directs a switching system to copy its files onto a remotely located administration computer from which the backed up information can be retrieved in the event of a system failure. In addition to facilitating system recovery, having the capability to retrieve system files allows other network administrative tasks to monitor and control the switching network.

11 Claims, 2 Drawing Sheets

METHOD AND APPARATUS TO AUTOMATICALLY BACK UP SWITCHING SYSTEM FILES

BACKGROUND OF THE INVENTION

This invention relates to computer-controlled networks. In particular, this invention relates to computer-controlled telephone switching networks.

The telephone switching system of the United States is a complex, interconnected network of computer-controlled switching systems that route telephone calls under stored program control. The computer programs controlling these switching systems are immense and require extremely complex databases to make the machines operational.

The failure of one of these switching systems could cause the loss of thousands, if not millions, of calls adversely effecting commerce and emergency services for thousands and perhaps millions of users of telephone services. Bringing a telephone switching system that has been destroyed or disabled back into service might require the complete replacement of the switching equipment itself, including the computer or computers that control it and could take weeks and even months to accomplish.

Disaster recovery plans of many telephone service providers now include the capability of re-routing telephone message traffic to a backup switching system, typically at another location. While a redundant or backup switching system might be theoretically capable of routing calls, such a system would need to be completely programmed to handle calls of a failed system. Such reprogramming would be a time-consuming task that might take weeks or even months to accomplish.

Since much of the time associated with switching system disaster recovery is associated with reprogramming a lost switching system, a method or apparatus that could shorten the time necessary to reconfigure a lost or otherwise failed switching system would be an improvement over the prior art. Accordingly, it is an object of the present invention to provide a method and an apparatus to automatically collect data necessary for system recovery or administrative purposes.

SUMMARY OF THE INVENTION

There is provided herein a method and an apparatus for automatically collecting files from telephone switching offices and backing up these files at a remote location. A maintenance or administrative computer is equipped with communication links to a telephone switching system computer over which commands can be sent to the telephone switching computer from the administrative computer. A program running on the administrative computer remotely executes commands on the telephone switching system computer via the communication link.

The telephone switching system computer is equipped with computer programs that are resident on the switching system computers and written to perform the task of sending and receiving data files from the telephone switching system computer to another switching system.

At predetermined times, and under program control, an administrative computer invokes the execution of these backup and maintenance programs on the Lucent Technologies, Inc. No. 4ESS™ switching systems from a remote location. When these programs are invoked, the No. 4ESS computer is instructed to copy key data and program files from computer memory devices of the No. 4ESS to the administrative computer where the files are stored on media from which they can be retrieved.

In the event the No. 4ESS from which the files were copied is lost to service or destroyed, the data files that were retrieved under the program control of the administrative computer, can be used to reconfigure a replacement No. 4ESS or configure a backup switching system located in a remote location.

DETAILED DESCRIPTION OF THE PREFERRED EMBODIMENT

Figure 1:
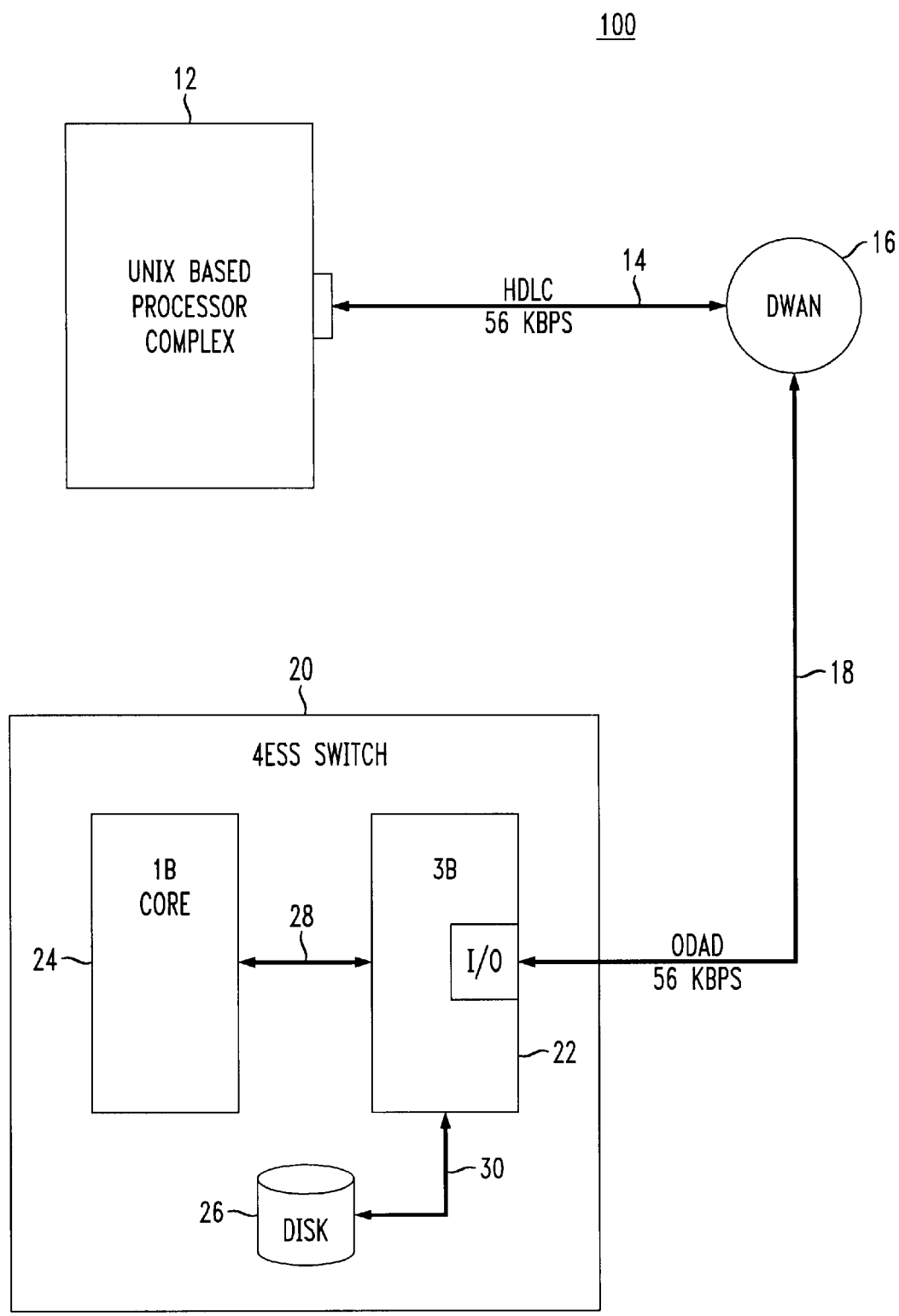
FIG. 1 shows a functional block diagram of a system by which program files from a telephone switching office can be automatically collected from a remote location.

FIG. 1 shows a functional block diagram of a computer-controlled switching system (20) remotely controlled whereby files on the switching system (20) can be automatically retrieved and backed up under program control. By automating the collection and archival of system-critical files used by a computer-controlled switching system, reconstruction of the system or reassignment of its tasks to another switching system is made considerably easier. In addition, system files collected by the invention can be used for administrative purposes. While the embodiment described herein applies to a telephone switching system, the invention would have applications in other high-reliability systems such as air trafic control and process control.

In FIG. 1, a computer network 100 is comprised of a computer controlled switching system 20, such as the Lucent Technologies, Inc. No. 4ESS™ switching system which is capable of being remotely controlled by an administrative computer, which in the preferred embodiment is a work station 12. The switching system 20 is comprised of switching circuitry (not shown) controlled indirectly by processor 22, such as the 3B processor manufactured and sold by Lucent Technologies, Inc. The processor 22 controls another processor 24, such as the 1B processor, also manufactured and sold by Lucent Technologies, Inc. The first processor 22 controls the second processor 24 by means of commands sent and received over a communications bus 28 linking the twvo processors 22, 24. The first processor 22, with or without the second processor 24, can be considered to be a control computer for the computer controlled switching system 20. The communications bus 28 coupling the first processor 22 and the second processor 24 used in the No. 4ESS™ switching system is well known in the art.

In a No. 4ESS™, the 1B core processor 24 controls a variety of tasks of a switching system 20 including the provisioning and configuration of switching systems and circuitry not shown. The 3B processor 22 controls the activity of the 1B processor using programs and data stored on a disk or disk resources 26. The program files for the processor 22 and data files on disk 26 are accessed by the 3B processor through a data bus 30.

The computer files of the No. 4ESS™ switch 20 are complex and include millions of bytes of program instructions and millions of data records. In the event that the No. 4ESS™ switching system 20 were to be destroyed, or otherwise made inoperative, thousands, or perhaps millions, of calls would be lost which could include the loss of public safety agency communications. Considerable time savings in the event of a system failure can be realized if the files on disk 26 are routinely and repetitively backed up at a remote location 12 whereby the functionality of the switch 20 might be duplicated on a remote switching system or replaced in a duplicate or replacement system using the records stored at the remote location 12.

In many switching applications, two or more No. 4 ESS™ systems can be coupled together to route calls. Virtually all No. 4ESS™ switching systems includes two programs, that are called MODAD and SODAD and well known in the art are specifically designed to exchange data files between No. 4ESS™ switching systems that are coupled together. These MODAD and SODAD programs are resident on and run in the 3B processors of the No. 4ESS™ switch 20. MODAD and SODAD are complements of each other; when two No. 4ESS™ switching systems are coupled together, one of the systems is designated as a master while the other may be designated as a slave. MODAD, running on a No. 4ESS™ switching system designated as a master, sends and receives files to/from another No. 4 ESS™ switching system designated as a slave which is running SODAD. MODAD and SODAD must run in pairs as complimentary programs to work.

In order to run SODAD and MODAD programs, the two No. 4ESS™ switching systems on which they are running, must be physically linked together. A high-level data link control (HDLC) data link, also known as an X.25 layer 2 protocol data link is physically coupled to a communications card of a 3B processor and comprises the physical communications link over which MODAD and SODAD exchange files.

In FIG. 1, a Sun® Microsystems work station 12 running the UNIX operating system is coupled to the No. 4ESS™ switching system 20 via a HDLC, X.25 data link 14 and 18 that are coupled together through a distributed wide area network or DWAN 16. The work station 12 effectively controls the switching system 20 and is considered to be an administrative computer for the switching system 20 and the processor 22 the work station 12 is coupled to.

DWAN 16 shown in FIG. 1 is a network of computers designed to facilitate network connectivity between two or more No. 4 ESS™ systems and the administrative computer, i.e. the work station 12. DWAN 16 is not necessary to practice the invention but it or a similar network is commonly used in No. 4 ESS™ applications. The DWAN network provides the 56 KBPS connectivity between the administrative computer and the No. 4ESS™ switch control computer.

A control program in the preferred embodiment called ODAD_SSM and running on the Sun® work station 12, shown in FIG. 1, emulates the functionality of the MODAD program resident on a No. 4ESS™ program. ODAD_SSM includes the capability of MODAD in that it can send and receive files between the Sun® work station 12 and any No. 4ESS™ switching system 20 that remotely executes the SODAD program but unlike MODAD, which requires operator intervention, ODAD_SSM can send and retrieve files automatically under its own control.

Figure 2:
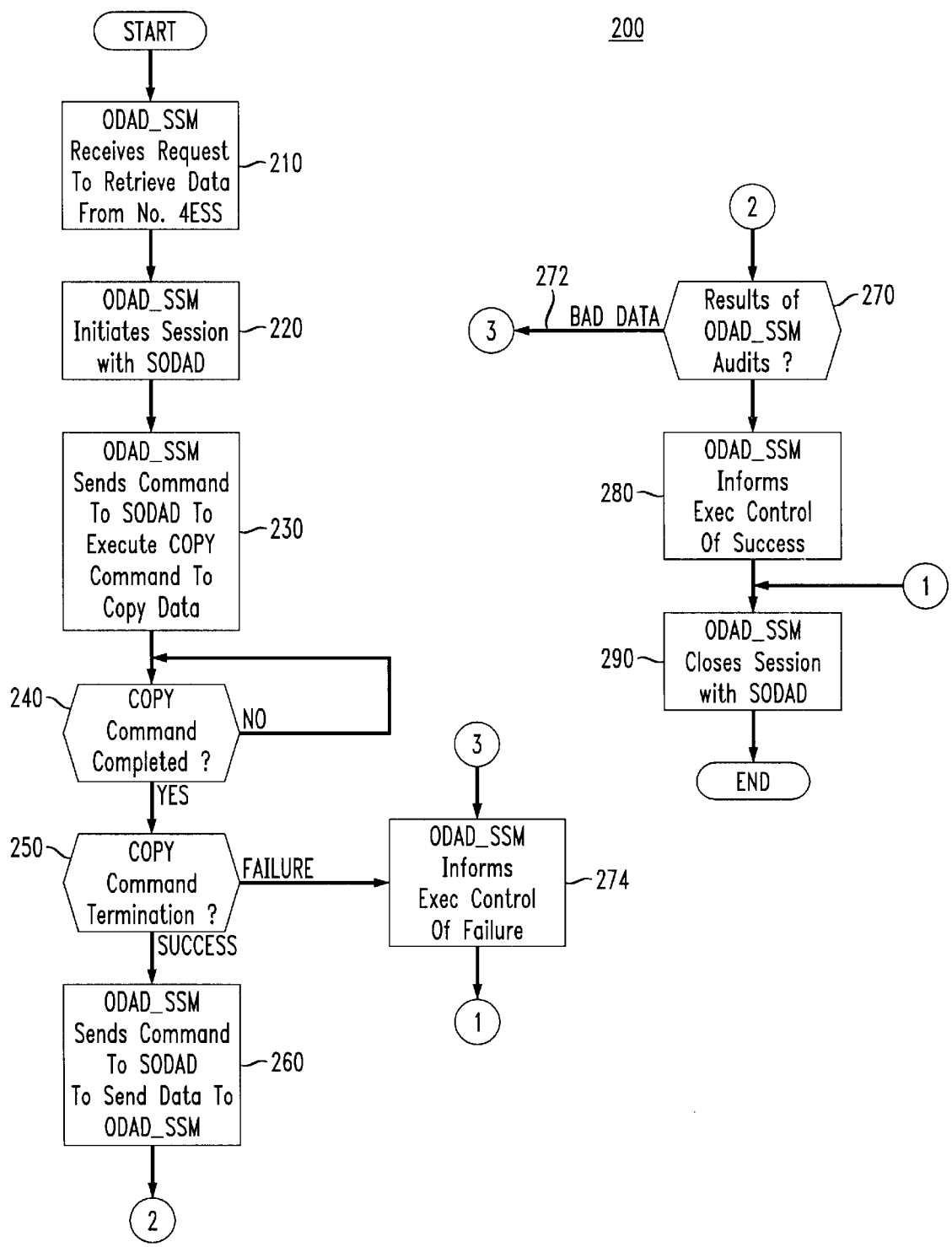
FIG. 2 shows a functional block diagram of a computer program which in the preferred embodiment is called "ODAD_SSM" an administrative program resident on the administrative computer 12 shown in FIG. 1.

FIG. 2 shows a functional block diagram 200 of the operation of the computer program which in the preferred embodiment is called "ODAD_SSM" and is an administrative program resident on the administrative computer 12 shown in FIG. 1.

ODAD_SSM is invoked and begins execution 210 when the work station 12 shown in FIG. 1 receives a request to retrieve data from the No. 4 ESS™ switch 20. A request to retrieve data from the No. 4 ESS™ can come into the work station 12 from an external input/output device such as a terminal coupled to the work station 12. A request to retrieve data from the No. 4 ESS™ can also be generated automatically from within the work station 12 by a timed program running on the work station 12.

ODAD_SSM initiates a communication session 220 with the program resident on the No. 4 ESS™ 20 that is commonly known as SODAD by sending a command string to the No. 4 ESS™ 20 to execute the well known COPY command 230 on the No. 4 ESS™ 20. The command to execute COPY is sent from the work station 12 to the No. 4 ESS™ via the high-level data link control (HDLC) communication link 14, through the DWAN 16 and thereafter over a data bus 18, commonly known as and referred to in the art as the ODAD bus or link. (When used in reference to a No. 4ESS™, ODAD stands for ODA data link. ODA stands for office data assembler.)

ODAD_SSM waits until the COPY command has completed execution 240 and upon the successful completion of the COPY command. Upon successful completion of the COPY by the No. 4ESS™, the ODAM_SSM will send a command to the SODAD program to execute another predetermined command which will start the retrieval, or transfer, of the desired data to the ODAD_SSM 260.

If the copied data is bad or otherwise corrupted 272, ODAD_SSM informs the executive control program of the work station 12 of the copy failure 274 and thereafter closes its session with SODAD 290. If during the execution of the COPY command on the No. 4 ESS™ 20 the COPY command does not successfully terminate 250, ODAD_SSM informs the executive control program of the work station 274 and terminates the session with SODAD 290.

The ODAD_SSM program can automatically invoke the execution of SODAD whereby files and executable programs can be repetitively and automatically transferred by SODAD out on the data link 28 to a destination identified by ODAD_SSM when it calls SODAD to execute. Files exported from a No. 4 ESS™ by its resident SODAD program are backed up at the Sun® work station 12 by the work station onto appropriate storage media such as magnetic tape, disk, or other appropriate storage medium.

By periodically and automatically backing up the files on a telephone switching system, to a remote location, a switching system lost to a natural disaster or otherwise made unavailable, can be brought back more expeditiously. Automatically backing up the files and program instructions without human intervention, assures that a lost switching system can be replaced or its switching tasks routed to a back up system more seamlessly. The capability to retrieve any data within a switching system allows other network elements the ability to more closely monitor and control provisioning maintenance and perform administrative functions on the switching network.

What is claimed is:

1. In a computer controlled switching system comprised of at least a first control computer coupled to file storage devices, said first control computer also being coupled to and communicating with at least one administrative computer coupled to file storage devices, said first control computer containing a first predetermined program by which said first control computer sends files to an external computer, said administrative computer containing a second predetermined program to which said first control computer sends files, a method of automatically copying a computer file from said first computer to said administrative computer without affecting the functionality of said first computer comprising the steps of:

a) establishing a communication link between said administrative computer and said first computer whereby said administrative computer can effectively control said first computer and in which said first predetermined program contained at said first computer is a SODAD program;

b) at said administrative computer, automatically invoking the execution of said second predetermined program to remotely control said first computer from said administrative computer;

c) automatically sending a predetermined command from said administrative computer to said first computer via said communications link to cause said first computer to copy at least one file from said first computer to said administrative computer via said communication link; and whereby said at least one file from said first computer is automatically and periodically copied from said first computer to said administrative computer under the control of a program running on said administrative computer.

2. The method of claim 1 further including the step of:
   e) at said administrative computer, storing said at least one file from said first computer into a file storage device.

3. The method of claim 1 further including the step of:
   e) at said administrative computer, storing said at least one file from said first computer into a random access memory device.

4. The method of claim 1 further including the step of:
   e) at said administrative computer, storing said at least one file from said first computer into a magnetic storage media.

5. The method of claim 1 wherein said second predetermined program by which said external computer receives files from said first control computer is the ODAD_SSM program for automatically retrieving files under the control of the administrative computer.

6. In a computer controlled telephone switching system comprised of at least one No. 4 ESS™ control computer coupled to file storage devices, said at least one No. 4 ESS™ control computer also being coupled to and communicating with at least one administrative computer coupled to file storage devices, said at least one No. 4 ESS™ control computer containing a SODAD computer program by which said at least one No. 4 ESS™ control computer sends files to an external administrative computer containing a ODAD_SSM program by which said at least one No. 4 ESS™ control computer sends files to said administrative computer, a method of automatically copying a computer file from said at least one No. 4 ESS™ control computer to said administrative computer without affecting the functionality of said telephone switching system comprised of the steps of:

a) establishing a communication link between said administrative computer and said at least one No. 4 ESS™ control computer whereby said administrative computer can effect control of said at least one No. 4 ESS™ control computer;

b) at said administrative computer, invoking the execution of said ODAD_SSM program to remotely control said at least one No. 4 ESS™ control computer, from said administrative computer;

c) sending a predetermined command to said at least one No. 4 ESS™ control computer from said administrative computer, via said communications link to cause said at least one No. 4 ESS™ control computer to copy at least one file from said at least one No. 4 ESS™ control computer to said administrative computer via said communication link; and whereby said at least one file from said at least one No. 4 ESS™ control computer is automatically and periodically copied from said first No. 4 ESS™ control computer to said administrative computer under the control of a program running on said administrative computer.

7. The method of claim 6 further including the step of:
   d) at said administrative computer, storing said at least one file from said No. 4 ESS™ control computer into a file storage device.

8. The method of claim 6 further including the step of:
   d) at said administrative computer, storing said at least one file from said first computer into a random access memory device.

9. The method of claim 6 further including the step of:
   d) at said administrative computer, storing said at least one file from said No. 4 ESS™ control computer into a magnetic storage media.

10. The method of claim 6 wherein said first predetermined program by which said No. 4 ESS™ control computer sends files to an external computer is the SODAD program.

11. The method of claim 6 wherein said administrative computer is a computer running the UNIX operating system.

* * * * *